US007009618B1

(12) United States Patent
Brunner et al.

(10) Patent No.: US 7,009,618 B1
(45) Date of Patent: Mar. 7, 2006

(54) INTEGRATED I/O REMAPPING MECHANISM

(75) Inventors: Richard A. Brunner, Olympia, WA (US); William Alexander Hughes, Burlingame, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 227 days.

(21) Appl. No.: 10/135,461

(22) Filed: Apr. 30, 2002

Related U.S. Application Data

(60) Provisional application No. 60/308,339, filed on Jul. 13, 2001.

(51) Int. Cl.
*G06F 12/02* (2006.01)
*G09G 5/36* (2006.01)

(52) U.S. Cl. ...................................... 345/566; 345/557

(58) Field of Classification Search ........ 345/564–568, 345/530, 531, 541–544, 557, 520; 711/147, 711/202–208
See application file for complete search history.

(56) References Cited

U.S. PATENT DOCUMENTS 5,506,953 A * 4/1996 Dao ........................... 345/564
5,872,998 A * 2/1999 Chee .......................... 711/147
6,097,402 A * 8/2000 Case et al. .................. 345/543
6,195,734 B1 * 2/2001 Porterfield .................. 711/203
6,249,853 B1 * 6/2001 Porterfield .................. 345/568
6,252,612 B1 * 6/2001 Jeddeloh ..................... 345/531
6,457,068 B1 * 9/2002 Nayyar et al. .............. 711/202
6,469,703 B1 * 10/2002 Aleksic et al. .............. 345/542
6,525,739 B1 * 2/2003 Gurumoorthy et al. ..... 345/566
6,665,788 B1 * 12/2003 Hughes ...................... 345/568
6,715,053 B1 * 3/2004 Grigor ........................ 711/170
6,886,090 B1 * 4/2005 Campbell ................... 345/568

OTHER PUBLICATIONS

Intel, "Draft AGP V3.0 *Interface Specification*," Revisional 0.95, May 2001, pp. 104-108.
Intel, "Technology Overview: Technology Graphics Port Technology," 2002, 9 pages.

* cited by examiner

*Primary Examiner*—Kee M. Tung
(74) *Attorney, Agent, or Firm*—Lawrence J. Merkel; Meyertons, Hood, Kivlin, Kowert & Goetzel, P.C.

(57) ABSTRACT

In a computer system, an address range is defined within the memory map. Addresses within the address range are mapped to other addresses within the memory map using an address relocation mechanism (e.g. the GART mechanism). The address range is divided into two portions. A graphics device may use the first portion to address a contiguous address space, and the addresses are remapped to other address using the address relocation mechanism. Particularly, the contiguous address space used by the graphics device may be remapped to non-contiguous pages elsewhere in the memory map. Other peripheral devices may use the second portion when performing data transfers to portions of the memory map above a predefined limit. The predefined limit may be the highest memory location in the memory map for which the peripheral device is capable of directly generating the address (e.g. 4 GB for a 32 bit address).

54 Claims, 7 Drawing Sheets

INTEGRATED I/O REMAPPING MECHANISM

This application claims benefit of priority to Provisional Patent Application Ser. No. 60/308,339 filed Jul. 13, 2001.

BACKGROUND OF THE INVENTION

1. Field of the Invention

This invention is related to the field of computer systems and processors, and more particularly to I/O remapping mechanisms in computer systems and processors.

2. Description of the Related Art

Generally, computer systems include one or more processors (also referred to in some cases as central processing units, or CPUs), memory (e.g. dynamic random access memory (DRAM), synchronous DRAM (SDRAM), RAMBUS DRAM (RDRAM), etc.), and one or more peripheral devices connected to one or more peripheral buses. Typically, the processors communicate with the peripheral devices through various registers (e.g. configuration and control registers in the peripheral device) for configuration and for relatively small amounts of data communication (e.g. control messages). These registers are often memory-mapped (i.e. assigned addresses in the memory map of the processor). Also, processors communicate with the peripheral devices for larger amounts of data using direct memory access (or DMA), in which a given peripheral device is provided with a memory address to directly transfer data to or from the memory locations at the memory address).

The amount of memory in many types of computer systems has often been less than 4 gigabytes (GB) (the amount of memory addressable with 32 bits of address). For example, the memory in personal computer (PC) systems and in many server computer systems has generally been less than 4 GB. In part, cost/performance tradeoffs have lead to such computer systems having less than 4 GB of memory.

Most peripheral devices are capable of generating 32 bit addresses. For example, many peripheral devices are designed for the Peripheral Component Interconnect (PCI) bus, which includes a 32 bit address. Accordingly, peripheral devices may DMA to any memory address and thus read/write any of the memory included in a computer system having less than 4 GB of memory.

The memory included in computer systems has been increasing, as has the memory addressing capability of many processors. Some processor architectures have included greater than 32 bits of addressing (e.g. up to 64 bits) for some time (e.g. the Alpha processor architecture, the Sparc processor architecture, or the PowerPC processor architecture). The x86 processor architecture (also referred to as IA-32) has had provisions for 36 bits of physical address (although virtual addresses were still limited to 32 bits) for some time as well. Recently, Advanced Micro Devices, Inc. announced an extension to the x86 processor architecture to allow for greater than 32 bits of addressing (e.g. up to 64 bits). Accordingly, more and more processors are capable of greater than 32 bits of addressing. Additionally, as the memory demands of the operating systems and application programs being used in computer systems increase, the amount of memory in computer systems has been increasing to satisfy the memory demands. Computer systems including greater than 4 GB of memory are thus expected to be more common.

While computer systems are expected to more frequently include more than 4 GB of memory, some peripheral devices are expected to be capable of addressing a maximum of 4 GB of memory. Such devices will not be able to directly address the memory at addresses above 4 GB. However, an operating system routine or application program may be allocated memory above the 4 GB limit, and may wish a peripheral device to DMA data to or from that memory.

Some computer systems may handle the above situation by copying the data to/from another block of memory below the 4 GB limit. For example, for a DMA write to memory, the DMA may be performed to a block of memory below the 4 GB limit and the data may be copied to the memory allocated to the receiving application program or operating system routine (above the 4 GB limit). For a DMA read from memory, the data to be read may be copied to a block of memory below the 4 GB limit and the DMA may be performed from that memory location. Additionally, some computer systems have included specific hardware (i.e. a separate chipset component) to use a separate I/O remapping table to remap peripheral addresses below the 4 GB limit to addresses above the 4 GB limit.

SUMMARY OF THE INVENTION

In a computer system, an address range is defined within the memory map. Addresses within the address range are mapped to other addresses within the memory map using an address relocation mechanism (e.g. the Graphics Aperture Relocation Table (GART) mechanism). The address range is divided into two portions. A graphics device may use the first portion to address a contiguous address space, and the addresses are remapped to other address using the address relocation mechanism. Particularly, the contiguous address space used by the graphics device may be remapped to non-contiguous pages elsewhere in the memory map. Other peripheral devices may use the second portion when performing data transfers to portions of the memory map above a predefined limit. The predefined limit may be the highest memory location in the memory map for which the peripheral device is capable of directly generating the address (e.g. 4 GB for a 32 bit address). Addresses in the second portion may be remapped to addresses above the predefined limit using the address relocation mechanism, thus allowing transfers to/from memory locations above the predefined limit without having to first copy the data to locations below the limit. The same address relocation mechanism may be used for both the graphics device and the other peripheral devices.

Broadly speaking, a method is contemplated. An address range is established within a memory map, the address range to be mapped to other addresses within the memory map through an address relocation table. A first portion of the address range is used for access by a graphics device to memory. A second portion of the address range is used for access by one or more peripheral devices to memory.

Additionally, a computer readable medium is contemplated, storing: (i) a first one or more instructions to establish an address range within a memory map, wherein addresses within the address range are to be mapped to other addresses within the memory map through an address relocation table; (ii) a second one or more instructions to configure a graphics device to use a first portion of the address range for accesses to memory; and (iii) a third one or more instructions to configure one or more peripheral devices to use a second portion of the address range for accesses to memory.

Furthermore, a computer system is contemplated, comprising one or more address relocation caches, a graphics device, and one or more peripheral devices. The address relocation caches are configured to store mappings between addresses within an address range of a memory map and other addresses within the memory map. The graphics device configured to access a first portion of the address range, and the one or more peripheral devices configured to access a second portion of the address range. The address relocation caches are coupled to receive addresses from the graphics device and the peripheral devices and to provide corresponding addresses outside of the address range if the addresses received from the graphics device and the peripheral devices are within the address range, the one or more address relocation caches providing the corresponding addresses responsive to the stored mappings.

BRIEF DESCRIPTION OF THE DRAWINGS

The following detailed description makes reference to the accompanying drawings, which are now briefly described.

Figure 1:
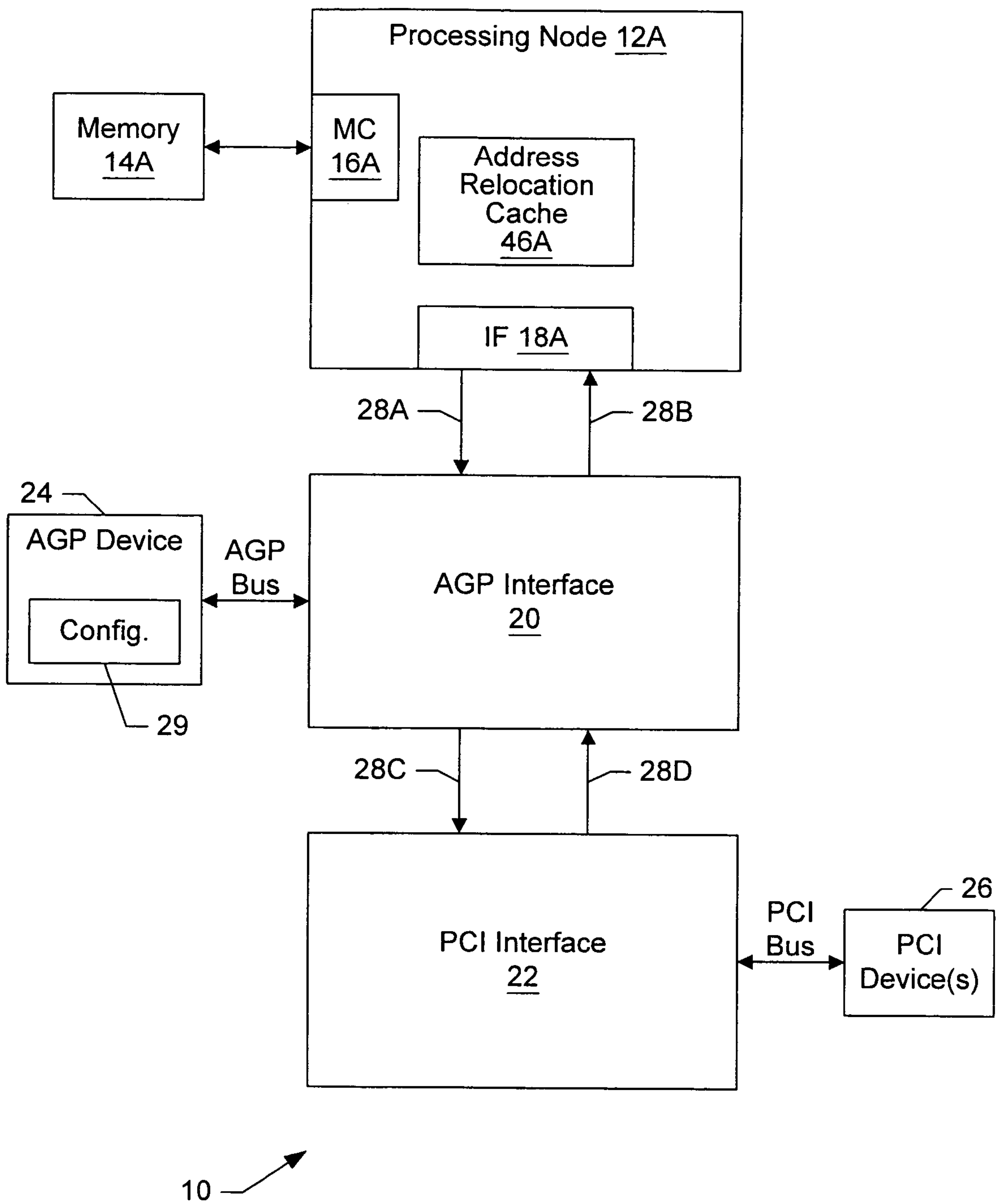
FIG. 1 is a block diagram of a first embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a computer system 10 is shown. Other embodiments are possible and contemplated. In the embodiment of FIG. 1, the system 10 includes a processing node 12A, an accelerated graphics port (AGP) interface circuit 20, a PCI interface circuit 22, an AGP device 24, and a PCI device 26. The AGP interface circuit 20 is coupled to the processing node 12A using point-to-point links 28A–28B and is coupled to the PCI interface circuit 22 using another set of point-to-point links 28C–28D. Each of the links 28A–28D may be unidirectional and may be packet-based (i.e. communication on the links may be packet-based). The AGP interface circuit 20 is further coupled to the AGP bus, to which the AGP device 24 is also coupled. The PCI interface circuit 22 is coupled to the PCI bus which is further coupled to one or more PCI devices 26. The AGP device 24 includes one or more configuration registers 29. The processing node 12A includes an interface (IF) 18A for communicating on the links 28A–28B, a memory controller (MC) 16A for communicating with a memory 14A, and an address relocation cache 46A.

The AGP interface circuit 20 is configured to provide an interface between the AGP bus (and thus from the AGP device 24) to the processing node 12A (over the links 28A–28B). Transactions initiated by the AGP device 24 on the AGP bus are received by the AGP interface circuit 20 and a transaction packet is generated on the link 28B to the processing node 12A. If a response to the transaction is expected, the response packet may be received on the link 28A by the AGP interface circuit 20 and routed onto the AGP bus. Similarly, transactions initiated by the processing node 12A and targeting the AGP device 24 are received by the AGP interface circuit 20 on the link 28A and are routed by the AGP interface circuit 20 onto the AGP bus. If a response to the transaction is expected, the response packet may be generated (based on the AGP device's response) and transmitted on the link 28B to the processing node 12A. Generally, the AGP interface circuit 20 is configured to convert between protocols on the links 28 and the AGP bus. The PCI interface circuit 22 may operate in a similar fashion with respect to the PCI bus (and the PCI device or devices 26 coupled to the PCI bus).

The AGP device 24 may be any type of graphics device. Generally, a graphics device is a device involved in the rendering of data as a visual image on a screen (such as a computer monitor). Graphics devices may include video cards, simple frame buffers, 2-D or 3-D graphics accelerators, or any combination of the above. Frequently, graphics devices such as AGP device 24 may access a large, contiguous address space (e.g. as much as 256 megabytes (MB) or 512 MB, in some cases). For example, data arranged as a screen image, one or more texture maps, etc. may be addressable as a contiguous address space. However, it is desirable to allow the operating system to allocate pages of memory to the graphics device without regard to the pages being contiguous (similar to its allocation of pages to application programs, etc.). To provide for the arbitrary allocation of pages to the graphics device while still allowing the graphics device to address a large, contiguous address space, the Graphics Aperture Relocation Table (GART) is used. In the GART mechanism, an address range in the memory map is allocated as an AGP aperture. The address range may not be mapped to memory locations. Instead, the addresses in the AGP aperture (physical addresses) may translate to a different physical addresses in the memory map. Thus, the graphics device may use the aperture as a large, contiguous address space and the addresses in the AGP aperture may be mapped to other physical addresses (through a set of page tables defined by the GART mechanism). The operating system may freely map the pages within the contiguous address space (e.g. to non-contiguous addresses).

The AGP aperture may be expanded to handle the PCI devices 26 which are capable of addressing a maximum of 4 GB if the memory 14A comprises more than 4 GB. Specifically, the AGP aperture may be allocated below the 4 GB limit and may be divided into two portions. The first portion may be the portion used by the AGP device 24 as the contiguous address space described above. The configuration registers 29 may be programmed with the base address and size of the first portion (or any other representation defining the first portion). The second portion may be used to permit transfers by the PCI devices 26 to and from the portion of the address map above 4 GB. Specifically, addresses in the second portion may be remapped, through the GART, to addresses above the 4 GB limit in the address map. The PCI device 26 may be programmed to perform the transfers to the addresses within the second portion of the aperture, and these addresses may be remapped by the GART mechanism to the addresses above the 4 GB limit.

The address relocation cache 46A may comprise multiple entries for caching mappings of addresses within the AGP aperture (including both the first portion used by the AGP device 24 and the second portion used by the PCI device or devices 26) to addresses elsewhere in the address map. Addresses received on the interface 18A are routed through the address relocation cache 46A. If a given address is within the AGP aperture and is a hit in the address relocation cache 46A, the corresponding address output by the address relocation cache 46A is passed to the memory controller 16A for the transaction. If the given address is within the AGP aperture and is a miss in the address relocation cache 46A, the GART (a set of page tables stored in memory) is searched to find the mapping and the mapping is loaded into the address relocation cache. The corresponding address is passed to the memory controller 16A for the transaction. If the given address is outside of the AGP aperture, the given address is passed to the memory controller 16A unmodified.

The first portion of the AGP aperture (used by the AGP device 24) is expected to be used to map addresses to anywhere within the memory map. The second portion (used by the PCI device 26) is expected to be used to map addresses to portions of the memory map above the 4 GB limit. If the PCI device is to transfer data to or from an address below the 4 GB limit, the PCI device may be programmed to generate such an address directly.

The PCI device 26 may be any type of peripheral device. Exemplary peripheral devices may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

As mentioned above, the links 28A–28D may be compatible with the HyperTransport™ specification developed by Advanced Micro Devices, Inc. The configuration shown in FIG. 1 of the AGP interface circuit 20 and the PCI interface circuit 22 is a daisy chain configuration. In other words, the AGP interface circuit 20 is coupled in series with the PCI interface circuit 22. Packets sent by the interface 18A to the PCI interface circuit 22 pass through the AGP interface 20, as do packets sent by the PCI interface circuit 22 to the interface 18A. While the AGP interface circuit 20 is arranged between the PCI interface circuit 20 and the processing node 12A in the daisy chain for the illustrated embodiment, other embodiments may arrange the PCI interface circuit 20 between the AGP interface circuit 22 and the processing node 12A.

Figure 6:
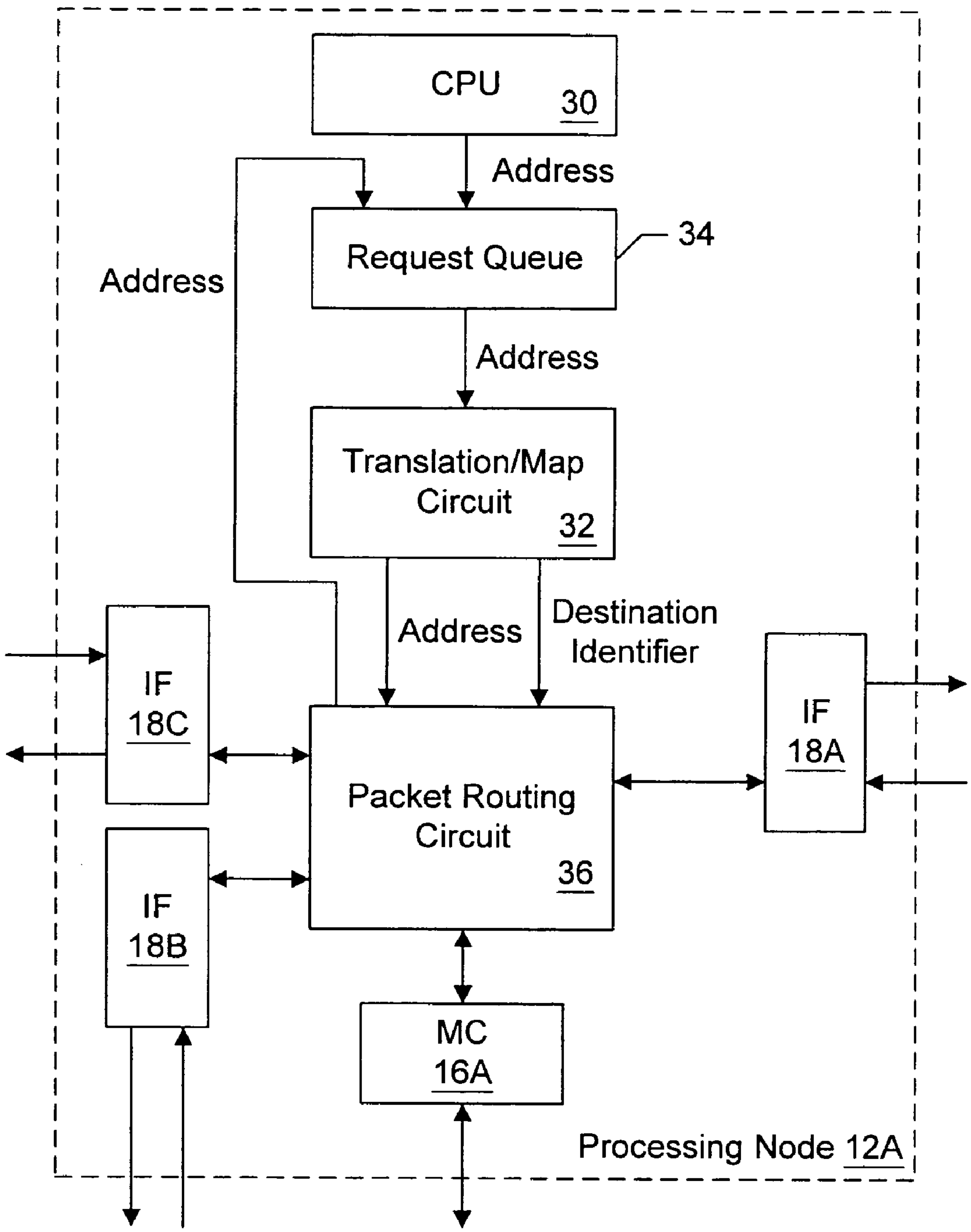
FIG. 6 is a block diagram of one embodiment of a processing node shown in FIG. 1 or 2.

The processing node 12A, in addition to a memory controller 14A, the interface logic 18A, and the address relocation cache 46A, may include one or more processors. The processors may be capable of generating physical addresses greater than 32 bits in size. In one particular implementation, for example, 40 bit physical addresses may be generated. Broadly speaking, a processing node comprises at least one processor and may optionally include other logic as desired. An exemplary processing node 12A is illustrated in FIG. 6.

The memory 14A may comprise any memory devices. For example, the memory 14A may comprise one or more RDRAMs, SDRAMs, DRAMs, static RAMs, etc. The memory controller 16A may comprise control circuitry for interfacing to the memory 14A. Additionally, the memory controller 16A may include request queues for queuing memory requests.

Figure 2:
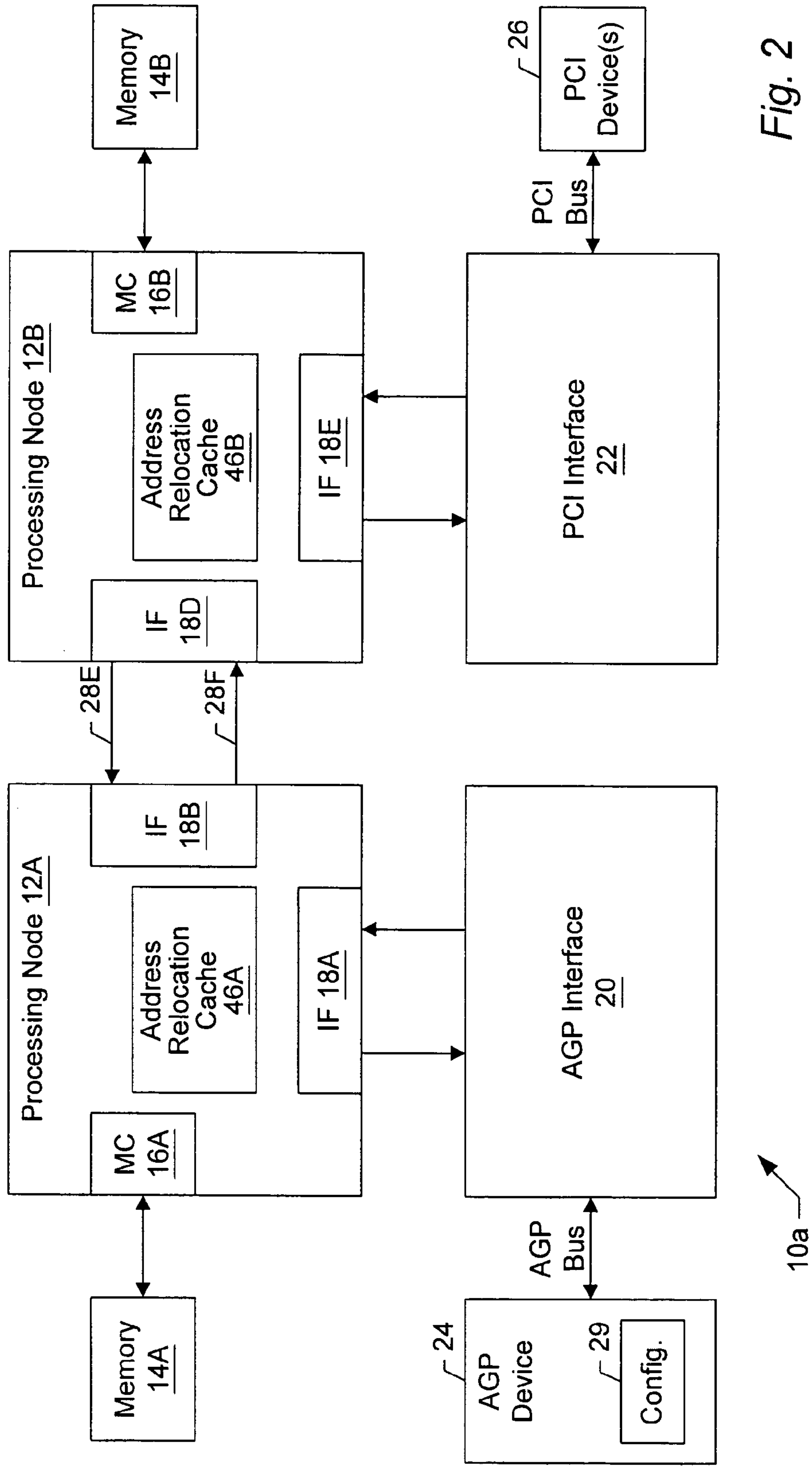
FIG. 2 is a block diagram of a second embodiment of a computer system.

FIG. 2 illustrates a second embodiment of the computer system 10 (computer system 10*a*). The computer system 10*a* includes the processing node 12A coupled, through the interface 18A, to the AGP interface circuit 20 (which is further coupled to the AGP device 24 via the AGP bus). Additionally, in this embodiment, the processing node 12A includes a second interface 18B to a second processing node 12B. The interface to the second processing node 12B may include a pair of unidirectional, point-to-point, packet-based lines 28E and 28F. However, the links between processing nodes may be implemented as coherent links, if desired. The processing node 12B includes interfaces 18D (for interfacing to the links 28E and 28F) and 18E (for interfacing to the PCI interface circuit 22 coupled thereto and further coupled to the PCI device(s) 26 through the PCI bus). Additionally, the processing node 12B includes an address relocation cache 46B and a memory controller 16B for interfacing to a memory 14B.

The processing node 12B may be similar in operation to the processing node 12A with regard to the mapping of addresses from the PCI interface 22. That is, the addresses from the PCI interface 22 may be presented to the address relocation cache 46B for relocation. If a given address is within the AGP aperture, the address is translated through the address relocation cache 46B to another address (with a possible search of the GART if the address is a miss in the address relocation cache 46B). If the given address is outside the AGP aperture, the given address is passed through unmodified.

In the illustrated embodiment, the address relocation cache 46A receives the AGP addresses from the AGP device 24 and the address relocation cache 46B receives the PCI addresses from the PCI device/devices 26. Thus, the address relocation cache 46A may generally store mappings corresponding to the AGP portion of the AGP aperture and the address relocation cache 46B may generally store mappings corresponding to the PCI portion of the AGP aperture. The address relocation cache 46A, since it does not receive addresses from the PCI device 26, generally does not store mappings corresponding to the PCI portion of the AGP aperture, and similarly the address relocation cache 46B generally does not store mappings corresponding to the AGP portion of the AGP aperture. Thus, competition for the entries in the address relocation caches between the PCI devices and the AGP device may be reduced.

Figure 3:
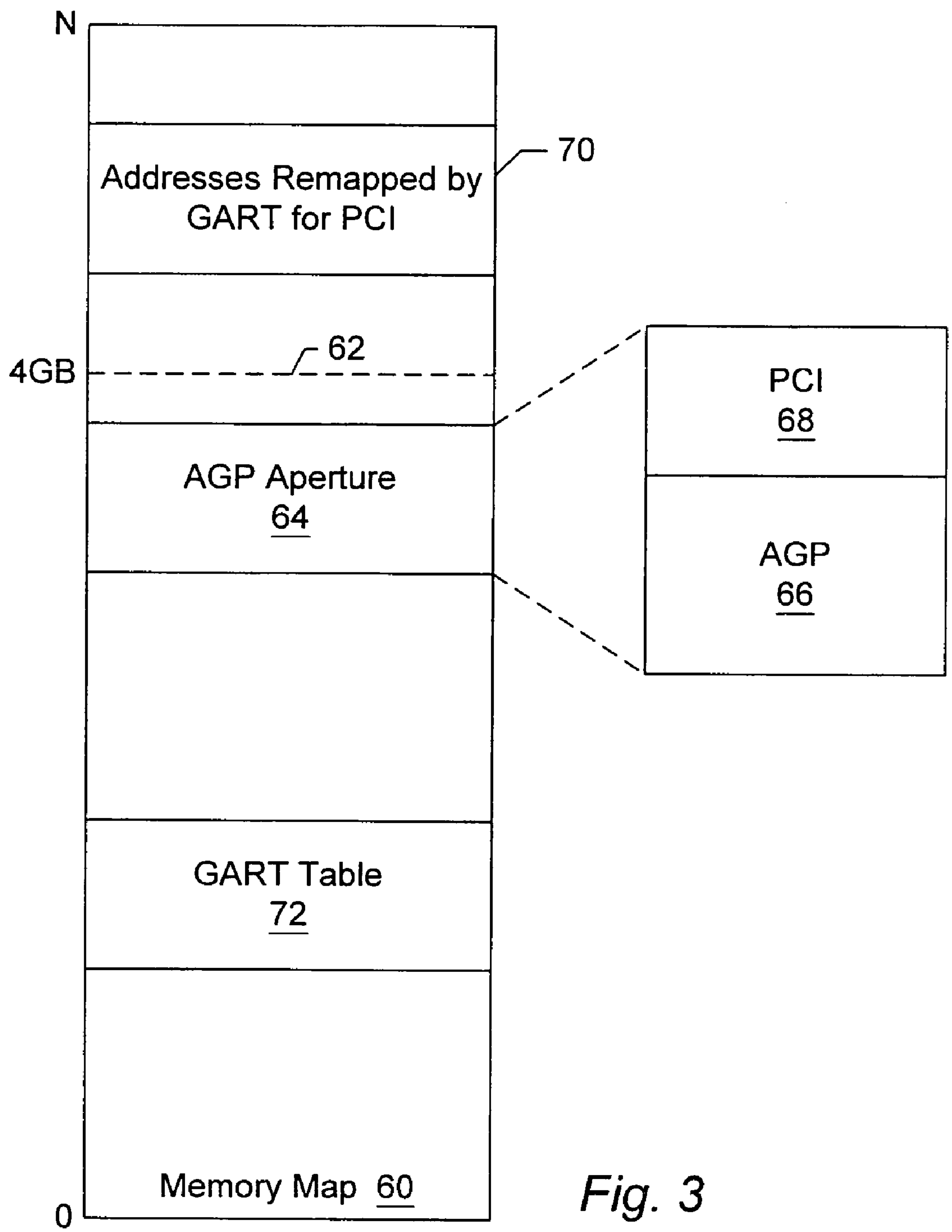
FIG. 3 is a block diagram illustrating a memory map for one embodiment of the computer systems shown in either FIG. 1 or 2.

Since both processing nodes 12A–12B in FIG. 2 are illustrated as coupled to memories 14A–14B, the computer system 10*a* is a distributed memory system. Each processing node 12A–12B may include an address map circuit which maps addresses to node numbers identifying the node which is coupled to the memory locations corresponding to the addresses. An example address map is shown in FIG. 3. It is noted that, while two processing nodes 12A–12B are illustrated in FIG. 2, other embodiments may include any number of processing nodes interconnected in any desirable fashion.

It is noted that, while the 4 GB limit is used in the exemplary embodiment described herein, any predetermined limit may be used based on the addressing capabilities of the peripheral devices of interest. Furthermore, while PCI devices are used as exemplary peripheral devices, peripheral devices designed to any peripheral interface may be used (e.g. universal serial port (USB), IEEE 1394

Firewire, Industry Standard Architecture (ISA) bus, Enhanced ISA bus (EISA), etc.). Similarly, while AGP graphics devices are shown, any type of graphics device using any peripheral interface may be used. While the GART mechanism is used as an exemplary address relocation mechanism, any address relocation mechanism may be used in other embodiments.

It is noted that, while the peripheral interface circuits (the AGP interface circuit 20 and the PCI interface circuit 22) are illustrated as interconnected with unidirectional, point-to-point, packet-based links, other interconnect is contemplated (e.g. busses, crossbars, etc.). Additionally, in other embodiments, the address relocation cache may be included in a bus bridge to a PCI bus and an AGP bus (e.g. the "Northbridge" of modern PC systems).

FIG. 3 is a block diagram illustrating an exemplary memory map 60 illustrating the addressable space for one embodiment of the computer system 10 or 10*a*. Address 0 is illustrated at the bottom of the memory map 60, up to address N at the top of the memory map 60. The 4 GB limit in the memory map is illustrated via the dashed line 62 within the memory map 60. The area below the dashed line 62 is addressed with addresses below 4 GB (addresses representable in 32 bits). The area above the dashed line 62 is addressed with addresses above 4 GB (addresses requiring more than 32 bits to represent). The memory map 60 may include the addresses mapped to storage locations in the memory 14A for the embodiment of FIG. 1, or the combination of the memory 14A and the memory 14B for the embodiment of FIG. 2. In other embodiments including more distributed memory nodes, the memory map 60 may include the addresses mapped to storage locations in each of the memories.

Additionally, some areas of the memory map 60 may not be mapped to memory locations in the memories 14A–14B. For example, the AGP aperture 64 may not be mapped to memory locations. Instead, the addresses within the AGP aperture 64 (a contiguous address range within the memory map 60) are detected by the address relocation cache(s) 46A–46B and related hardware (the "GART hardware") and are mapped to other addresses within the memory map 60. Other areas which are not mapped to memory locations may include, for example, areas which are memory mapped to various peripheral device configuration/control registers (e.g. configuration registers 29 in the AGP device 24 and similar configuration/control registers (not shown) in the PCI device(s) 26 and other peripheral devices (not shown)). The memory mapped configuration/control areas are not shown in FIG. 3.

The AGP aperture 64 is shown in exploded view to include two address range portions 66 and 68. The AGP portion 66 is the portion of the AGP aperture 64 which is used by the AGP device 24. The configuration registers 29 may be programmed to use the AGP portion 66. The PCI portion 68 is used to map addresses used by PCI devices to addresses above the 4 GB limit (e.g. addresses such as the block 70 in the memory map 60). The AGP device 24 is not configured to use the PCI portion 68 of the AGP aperture 64, but the GART hardware is configured to remap the addresses in the PCI portion 68 using the GART mechanism.

The GART tables are stored in the memories 14A–14B (illustrated in the memory map 60 at reference numeral 72). Generally, the GART tables store information which maps addresses in the AGP aperture 64 to other addresses within the memory map 60. In other words, the GART tables map physical addresses to other physical addresses. The format and content of the GART tables may vary from implementation to implementation.

It is noted that, while the PCI portion 68 is illustrated above the AGP portion 66 in the embodiment of FIG. 3 (i.e. at numerically higher addresses), the PCI portion 68 may be below the AGP portion 66 in other embodiments, as desired.

Figure 4:
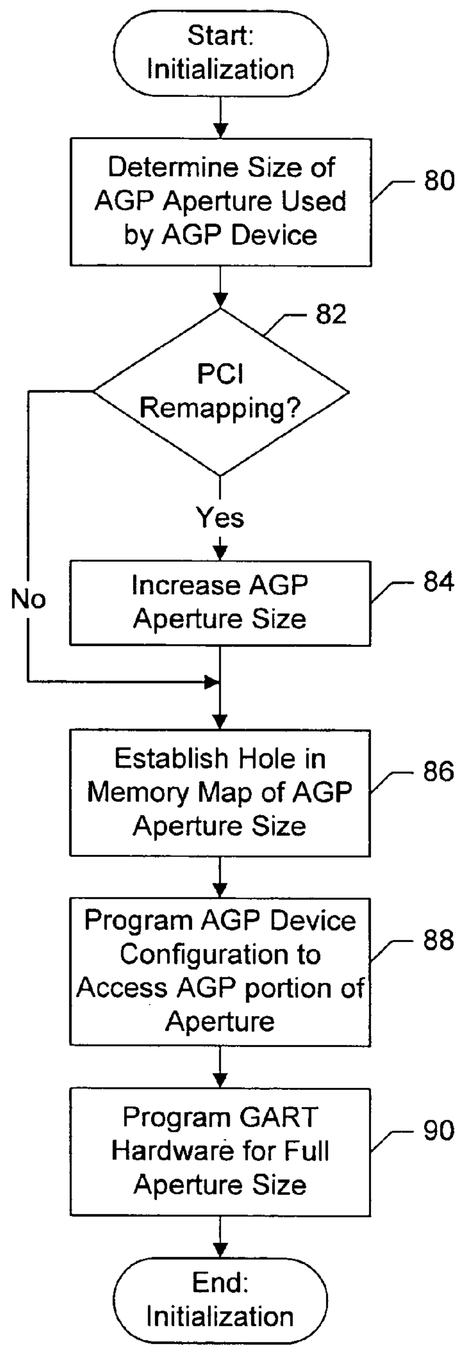
FIG. 4 is a flowchart illustrating a portion of an initialization routine which initializes one embodiment of the computer systems shown in either FIG. 1 or 2.

Turning now to FIG. 4, a flowchart illustrating a portion of one embodiment of the initialization of the computer system 10 or 10*a* is shown. Other embodiments are possible and contemplated. In one embodiment, the blocks shown in FIG. 4 may each represent one or more instructions executed by a processor within one of the processing nodes 12A–12B. While the blocks shown are illustrated in a particular order for ease of understanding, any order may be used, as desired.

The initialization code may determine the size of the AGP aperture used by the AGP device (block 80). The determination of block 80 may be performed in a variety of fashions. For example, the initialization code may query the AGP device (or a video output device, such as a monitor, coupled to the computer system) to determine the requested size of the AGP aperture. Alternatively, the size may be stored in operating system configuration files for the system or in other non-volatile storage such as CMOS RAM.

The initialization code may determine if PCI remapping is used (decision block 82). PCI remapping may not be used, for example, if there are no PCI devices in the system. Alternatively, if the PCI devices in the system are capable of addressing the entire memory map, PCI remapping may not be used. The PCI devices may be capable of addressing the entire memory map if the amount of memory is less than 4 GB, or if the PCI devices (and the PCI bus) provide for more the 32 bits of addressing.

If PCI remapping is used, the initialization code may increase the size of the AGP aperture (block 84), thus allocating the PCI portion of the AGP aperture. The size of the AGP portion and the size of the PCI portion may be any desired sizes. For example, an 8 MB PCI portion and a 256 MB or 512 MB AGP portion may be selected.

The initialization code may establish a hole in the memory map of the AGP aperture size, below the 4 GB limit (block 86). A hole in the memory map means that no memory locations in the memories 14A–14B are mapped to the addresses corresponding to the hole. The initialization code may program the AGP device 24 to access the AGP portion of the aperture (e.g. by updating the configuration registers 29—block 88) and may program the GART hardware to perform remapping for the full aperture size (AGP portion and PCI portion—block 90). For example, the address relocation caches 46A–46B may include a relocation region register or registers which are programmed to describe the address range which is remapped using the GART mechanism.

Figure 5:
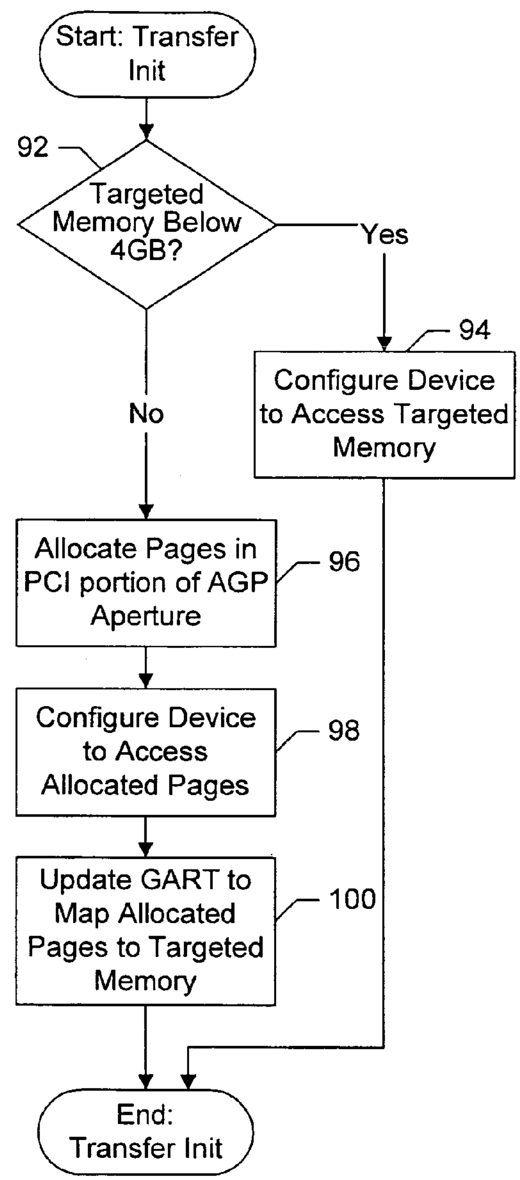
FIG. 5 is a flowchart illustrating a portion of a data transfer mapping routine for one embodiment of the computer systems shown in either FIG. 1 or 2.

Turning now to FIG. 5, a flowchart illustrating a portion of one embodiment of the data transfer initialization in the computer system 10 or 10*a* is shown. Other embodiments are possible and contemplated. In one embodiment, the blocks shown in FIG. 5 may each represent one or more instructions executed by a processor within one of the processing nodes 12A–12B. While the blocks shown are illustrated in a particular order for ease of understanding, any order may be used, as desired. Generally, the blocks shown in FIG. 5 may be executed at any time that a data transfer is to be initialized in a peripheral device (e.g. the PCI device 26).

If the data transfer being initialized is targeted at memory below the 4 GB limit (decision block 92), then the data transfer may be performed directly to the targeted memory. The transfer code may configure the PCI device to access the targeted memory (block 94). In other words, the PCI device to perform the data transfer may be given the address of the targeted memory for reading or writing the targeted memory. The PCI device uses the address during the transaction or transactions to perform the data transfer.

On the other hand, if the data transfer is targeted at memory above the 4 GB limit, the data transfer code may allocate one or more pages in the PCI portion of the AGP aperture (block 96). The data transfer code may access a data structure indicating which of the pages in the PCI portion are not currently in use to allocate the pages. The data transfer code may configure the PCI device to access the allocated page or pages (block 98). In other words, the PCI device to perform the data transfer may be given the address of the allocated page (within the PCI portion of the AGP aperture) for reading or writing. The PCI device uses the provided address during the transaction or transactions to perform the data transfer. Additionally, the data transfer code may update the GART tables to map the allocated pages to the targeted memory (block 100). Once the data transfer is complete, the mappings may be deleted from the GART table (and the address relocation caches 46A–46B).

It is noted that the PCI device may be configured in a variety of fashions to perform a data transfer. For example, the PCI device may include registers to be programmed to perform the data transfer. The registers may include an address to be used in the transfer (either the address of the targeted memory or the address within the PCI portion of the AGP aperture, as described above), the number of bytes to transfer, etc. Generally, the provided address is used as the address of the initial transaction of the data transfer. If subsequent transactions occur within the data transfer, an address derived from the provided address (e.g. incremented by the number of bytes already transferred in previous transactions) may be used in the subsequent transactions. It is noted that the PCI portion of the AGP aperture may be used for any type of data transfer (e.g. DMA, etc.), as desired.

Not shown is a flowchart for allocating pages to the AGP portion of the AGP aperture. Generally, pages may be allocated to the pages within the AGP portion of the AGP aperture (and the pages within the AGP portion may be remapped to other pages) in any desired fashion. The mapping of pages in the AGP portion may be correlated with page mapping in virtual to physical address mapping mechanism employed by the operating system of computer system 10 or 10*a*, as desired.

Turning now to FIG. 6, a block diagram of one embodiment of a processing node 12A is shown. Other processing nodes may be configured similarly. Other embodiments are possible and contemplated. In the embodiment of FIG. 6, the processing node 12A includes a CPU 30, an translation/map circuit 32, a request queue 34, a packet routing circuit 36, the memory controller 16A, and interfaces 18A–18C. The CPU 30 and the packet routing circuit 36 are coupled to the request queue 34, which is coupled to the translation/map circuit 32. The translation/map circuit 32 is further coupled to the packet routing circuit 36. The packet routing circuit 36 is coupled to the interfaces 18A–18C (each of which may be coupled to respective unidirectional links in the present embodiment) and the memory controller 16A (which may be coupled to the memory 14A as shown in FIGS. 1 and 2).

Figure 7:
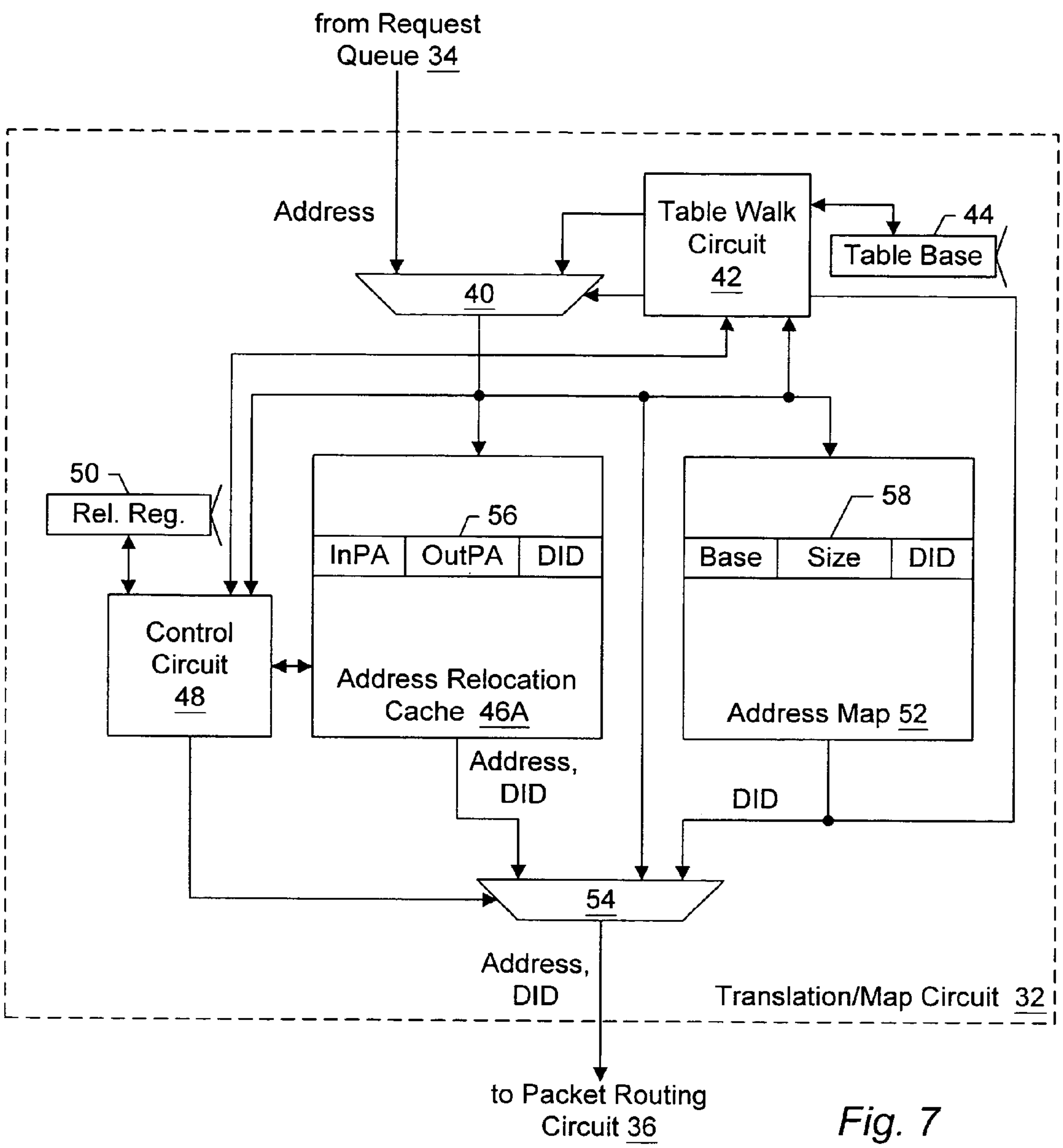
FIG. 7 is a block diagram of one embodiment of a translation/map circuit shown in FIG. 6.

Generally, the CPU 30 may generate transactions in response to instructions executing thereon. Additionally, transactions may be received through the interfaces 18A–18C. The addresses (and other information, as desired) of the CPU 30 transactions may be queued in the request queue 34. Additionally, the addresses (and other information, as desired) of the transactions received from an interface 18A–18C which is coupled to a peripheral interface circuit such as the AGP interface circuit 20 and/or the PCI interface circuit 22 may be queued in the request queue 34. Once selected from the request queue 34, the address may be presented to the translation/map circuit 32. The translation/map circuit 32 (which includes the address relocation cache 46A, as illustrated in FIG. 7 below) may translate the address through the address relocation cache 46A (if the address is within the AGP aperture). Additionally, in embodiments in which multiple processing nodes are included, the translation/map circuit 32 may generate a destination identifier which identifies the destination of the transaction. The destination identifier may include a variety of information, depending on the embodiment. The (possibly translated) address and the destination identifier are provided to the packet routing circuit 36. Using the destination identifier, the packet routing circuit 36 may create a packet for the transaction and transmit the packet on one or more of the interfaces 18A–18C responsive to the destination identifier. Furthermore, if the destination identifier indicates that the processing node 12A is the destination of the transaction, then the packet routing circuit 36 may route the packet to the memory controller 16A (or a host bridge to a peripheral device, if the address is an I/O address).

In one embodiment, the packet routing circuit 36 may include information identifying which of the interfaces 18A–18C are coupled to peripheral devices (or other devices which may require translation and destination identifier mapping). For example, the packet routing circuit 36 may include or be coupled to a configuration register which may be programmed with a bit for each interface, indicating whether or not that interface is coupled to peripheral devices. The packet routing circuit 36 may route addresses from packets received on interfaces identified as being coupled to I/O devices to the request queue 34 for possible translation and destination identifier mapping. Packets from other interfaces may be routed based on the destination identifier information.

In some embodiments, in addition to supplying the address of packets from the packet routing circuit 36 to the request queue 34 when addresses may require translation and/or destination identifier mapping, the packet routing circuit 36 may supply other information from the packet, or even the entire packet, to the request queue 34. Circuitry within the request queue 34 or coupled thereto (not shown in FIG. 6) may perform other processing on the packet, related to transmitting the packet from a non-coherent I/O domain into a coherent domain. Alternatively, such circuitry may be implemented in the interfaces 18A–18C or the packet routing circuit 36.

In another embodiment, the packet routing circuit 36 may include the relocation region register 50 (shown in FIG. 7 below), or a shadow register of the relocation region register, for comparing addresses from packets to determine if the packets require translation. The addresses of packets which require translation (and a destination identifier for the translated address) may be routed to the request queue 34 and other packets (having addresses that don't require translation and which have destination identifiers) may be routed based on the destination identifier already in those packets.

In one implementation, the translation/map circuit 32 may include both an address relocation cache and an address map. An exemplary implementation is shown in FIG. 7 below. The address map may include an indication of one or more address ranges and, for each range, a destination identifier identifying the destination for addresses within that range. The address relocation cache may store input addresses and corresponding output addresses, where a given output address is the result of translating a given input address through the GART. Additionally, the address relocation cache may store the destination identifier corresponding to the output address. Particularly, the destination identifier may be stored into a given entry of the address relocation cache when the input address and corresponding output address are stored in the entry. In this manner, the serial nature of the address translation and the mapping of the translated address to the destination identifier may be performed in a more parallel fashion for addresses that hit in the address relocation cache. The latency of initiating a transaction may be shortened by obtaining the translation and the destination identifier concurrently. Instead, the latency may be experienced when a translation is loaded into the address relocation cache.

In one embodiment, the input address to the translation/map circuit 32 may be presented to the address map in parallel with the address relocation cache. In this manner, if the input address is not within a memory region for which addresses are translated, the address map output may be used as the destination identifier. Thus, a destination identifier may be obtained in either case.

As used herein, the term "destination identifier" refers to one or more values which indicate the destination of a transaction having a particular address. The destination may be the device (e.g. memory controller, I/O device, etc.) addressed by the particular address, or a device which communicates with the destination device. Any suitable indication or indications may be used for the destination identifier. For example, in a distributed memory system such as the one shown in FIG. 2, the destination identifier may comprise a node number indicating which node is the destination of the transaction.

The packet routing circuit 36 may be further configured to receive packets from the interfaces 18A–18C and the memory controller 16A and to route these packets onto another interface 18A–18C or to the CPU 30, depending on destination information in the packet. For example, packets may include a destination node field which identifies the destination node, and may further include a destination unit field identifying a particular device within the destination node. The destination node field may be used to route the packet to another interface 18A–18C if the destination node is a node other than the processing node 12A. If the destination node field indicates the processing node 12A is the destination, the packet routing circuit 36 may use the destination unit field to identify the device within the node (e.g. the CPU 30, the memory controller 16A, and any other devices which may be included in the processing node 12A) to which the packet is to be routed.

The CPU 30 may be any type of processor (e.g. an x86-compatible processor, a MIPS compatible processor, a SPARC compatible processor, a Power PC compatible processor, etc.). Generally, the CPU 30 includes circuitry for executing instructions defined in the processor architecture implemented by the CPU 30. The CPU 30 may be pipelined, superpipelined, or non-pipelined, and may be scalar or superscalar, as desired. The CPU 30 may implement in-order dispatch/execution or out of order dispatch/execution, as desired.

Turning now to FIG. 7, a block diagram of one embodiment of the translation/map circuit 32 is shown. Other embodiments are possible and contemplated. In the embodiment of FIG. 7, the translation/map circuit 32 includes an input multiplexor (mux) 40, a table walk circuit 42, a table base register 44, an address relocation cache 46A, a control circuit 48, a relocation region register 50, an address map 52, and an output mux 54. The input mux 40 is coupled to receive an address from the request queue 34, and is further coupled to receive an address and a selection control from the table walk circuit 42. The output of mux 40 is an input address to the address relocation cache 46A, the control circuit 48, the address map 52, the output mux 54, and the table walk circuit 42. The table walk circuit 42 is further coupled to the table base register 44 and to receive the destination identifier (DID in FIG. 7) from the address map 52. The table walk circuit 42 is further coupled to the control circuit 48, which is coupled to the relocation region register 50, the output mux 54, and the address relocation cache 46A. The address relocation cache 46A and the address map 52 are further coupled to the output mux 54.

Generally, the address relocation cache 46A receives the input address and outputs a corresponding output address and destination identifier (if the input address is a hit in the address relocation cache 46A). The output address is the address to which the input address translates according to the GART mechanism. Thus, the input address and output address are both physical addresses in this embodiment (InPA and OutPA in the address relocation cache 46A). The destination identifier is the destination identifier from the address map 52 which corresponds to the output address.

The address relocation cache 46A is generally a memory comprising a plurality of entries used to cache recently used translations. An exemplary entry 56 is illustrated in FIG. 7. The entry 56 may include the input address (InPA), the corresponding output address (OutPA), and the destination identifier (DID) corresponding to the output address. Other information, such as a valid bit indicating that the entry 56 is storing valid information, may be included as desired. The number of entries in the address relocation cache 46A may be varied according to design choice. The address relocation cache 46A may have any organization (e.g. direct-mapped, set associative, or fully associative). Furthermore, any memory may be used. For example, the address relocation cache 46A may be implemented as a set of registers. Alternatively, the address relocation cache 46A may be implemented as a random access memory (RAM). In yet another alternative, the address relocation cache 46A may be implemented as a content address memory (CAM), with the comparing portion of the CAM being the input address field. Circuitry for determining a hit or miss and selecting the hitting entry may be within the address relocation cache 46A (e.g. the CAM or a cache with comparators to compare one or more input addresses from indexed entries to the input address received by the cache) or control circuit 48 as desired, and the address relocation cache 46A may be configured to output the output address and the destination identifier from the hitting entry. Generally, an input address is a hit in an entry if the portion of the input address stored in the entry (up to all of the input address, depending on the embodiment) and a corresponding portion of the received input address match.

Each of the entries 56 may correspond to one translation in the translation tables. Generally, the translation tables may provide translations on a page basis. For example, 4 kilobyte pages may be typical, although 8 kilobytes has been used as well as larger pages such as 1, 2, or 4 Megabytes. Any page size may be used in various embodiments. Accordingly, some of the address bits are not translated (e.g.

those which define the offset within the page). Instead, these bits pass through from the input address to the output address unmodified. Accordingly, such bits may not be stored for either the input address or the output address in a given entry 56. Generally, an entry 56 may store at least a portion of an input address. The portion may exclude the untranslated portion of the input address. Additionally, in embodiments in which one or more entries 56 are selected via an index portion of the address (e.g. direct-mapped and set associative embodiments), the index portion of the address may be excluded. Similarly, an entry 56 may store at least a portion of an output address. The portion may exclude the untranslated portion of the output address. For simplicity and brevity herein, input address and output address will be referred to. However, it is understood that only the portion of either address needed by the receiving circuitry may be used. It is noted that the portion of the input address provided to the address relocation cache 46A, the address map 52, and the control circuit 48 may differ in size (e.g. the address relocation cache 46A may receive the portion excluding the page offset, the address map 52 may receive the portion which excludes the offset within the minimum-sized region for a destination identifier, etc.).

In the present embodiment, translation is provided within the AGP aperture (including both PCI and AGP portions) and is not provided outside of the AGP aperture. Accordingly, the address map 52 may receive the input address in parallel with the address relocation cache 46A. The address map 52 may output the destination identifier corresponding to the input address. Generally, the address map 52 may include multiple entries (e.g. an exemplary entry 58 illustrated in FIG. 7). Each entry may store a base address of a range of addresses and a size of the range, as well as the destination identifier corresponding to that range. The address map 52 may include circuitry to determine which range includes the input address, to select the corresponding destination identifier for output. The address map 52 may include any type of memory, including register, RAM, or CAM. While the illustrated embodiment uses a base address and size to delimit various ranges, any method of identifying a range may be used (e.g. base and limit addresses, etc.).

The control circuit 48 may receive the input address and may determine whether or not the input address is in the AGP aperture (as defined by the relocation region register 50). The relocation region register 50 may be programmed by the initialization code in block 90 (FIG. 4). If more than one address relocation cache is used (e.g. FIG. 2), each of the relocation region registers 50 corresponding to each of the address relocation caches may be programmed similarly.

If the address is in the AGP aperture and is a hit in the address relocation cache 46A, the control circuit 48 may select the output of the address relocation cache 46A through the output mux 54 as the output address and destination identifier from the translation/map circuit 32. If the address is in the AGP aperture but is a miss in the address relocation cache 46A, the control circuit 48 may signal the table walk circuit 42 to read the GART page tables and locate the translation for the input address. If the address is outside of the AGP aperture, the control circuit 48 may select the input address and the destination identifier corresponding to the input address (from the address map 52) through the output mux 54 as the output address and destination identifier from the translation/map circuit 32.

As mentioned above, the translation tables may vary in form and content from embodiment to embodiment. Generally, the table walk circuit 42 is configured to read the translation tables implemented in a given embodiment to locate the translation for an input address which misses in the address relocation cache. The translation tables may be stored in memory (e.g. a memory region beginning at the address indicated in the table base register 44, which may be programmed in block 90, FIG. 4) and thus may be mapped by the address map 52 to a destination identifier. The table walk circuit 42 may generate addresses within the translation tables to locate the translation and may supply those addresses through the input mux 40 to be mapped through address map 52. The table walk circuit 42 is thus coupled to receive the destination identifier from the address map 52. If the table walk circuit 42 is not in the midst of a table walk, the table walk circuit 42 may be configured to allow the addresses from the request queue 34 to be selected through the input mux 40.

Once the table walk circuit 42 locates the translation, the table walk circuit 42 may supply the output address corresponding to the input address though the input mux 40 in order to obtain the destination identifier corresponding to the output address. The destination identifier, the output address, and the input address may be written into the address relocation cache 46A.

While the table walk circuit 42 is shown as a hardware circuit for performing the table walk in FIG. 3, in other embodiments the table walk may be performed in software executed on the CPU 30 or another processor. Similarly, the table walk may be performed via a microcode routine in the CPU 30 or another processor.

It is noted that, while the input mux 40 is provided in the illustrated embodiment to select among several address sources, other embodiments may provide multi-ported address relocation caches and address maps to concurrently service more than one address, if desired.

It is noted that, while the embodiment of FIGS. 6 and 7 discusses an address relocation cache embodiment which stores the destination identifier, other embodiments may not include such functionality (e.g. embodiments used in non-distributed memory systems, such as the embodiment of FIG. 1). Furthermore, such embodiments may omit the address map 52. Still further, other embodiments may implement the address relocation cache in the packet routing circuit 36 or coupled thereto, or in any other fashion. The terms translation and relocation (or address translation and address relocation) may be used synonymously herein.

Figure 8:
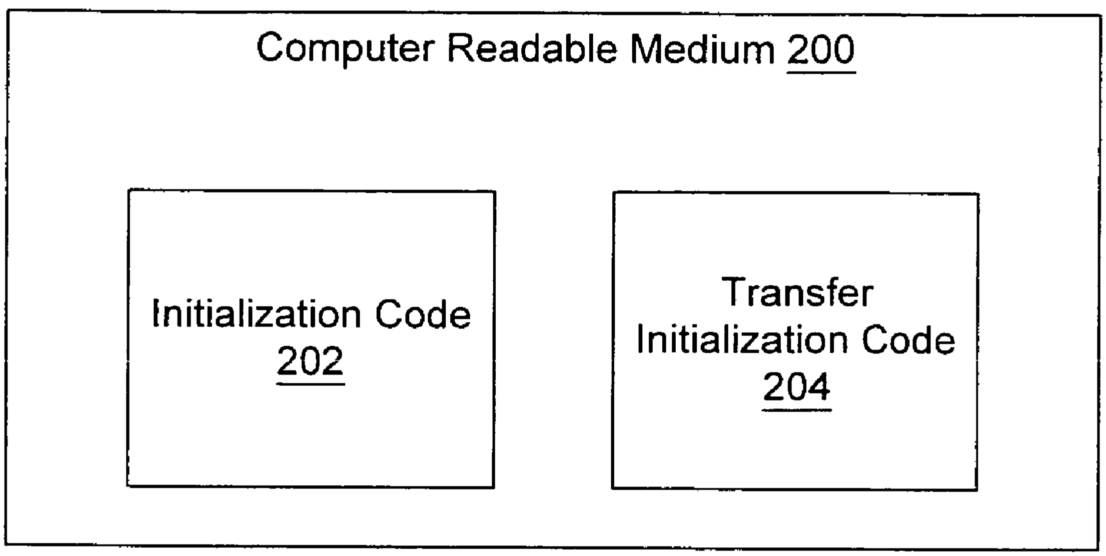
FIG. 8 is a block diagram of a computer readable medium storing code corresponding to the flowcharts of FIGS. 4 and 5.

Turning next to FIG. 8, a block diagram of one embodiment of a computer readable medium 200 is shown. Generally, a computer readable medium may include any storage media such as magnetic or optical media, e.g., disk or CD-ROM, volatile or non-volatile memory media such as RAM (e.g. SDRAM, RDRAM, SRAM, etc.), ROM, etc. Furthermore, a computer readable medium may include any combination of two or more of the above mentioned media.

The computer readable medium 200 may store initialization code 202 and transfer initialization code 204. The initialization code 202 may include one or more instruction sequences including sequences to perform the blocks shown in the flowchart of FIG. 4. The transfer initialization code 204 may include one or more instruction sequences including sequences to perform the blocks shown in the flowchart of FIG. 5.

Numerous variations and modifications will become apparent to those skilled in the art once the above disclosure is fully appreciated. It is intended that the following claims be interpreted to embrace all such variations and modifications.

What is claimed is:

1. A method comprising:

establishing an address range within a memory map, the address range to be mapped to other addresses within the memory map through an address relocation table;

using a first portion of the address range for access by a graphics device to memory; and using a second portion of the address range for access by one or more peripheral devices to memory, wherein the one or more peripheral devices are different from the graphics device.

2. The method as recited in claim 1 wherein the second portion of the address range is mapped to portions of the memory map above a predetermined limit.

3. The method as recited in claim 2 wherein the predetermined limit is four gigabytes.

4. The method as recited in claim 2 wherein the first portion of the address range is mapped anywhere in the memory map.

5. The method as recited in claim 2 wherein the one or more peripheral devices access addresses in the memory map below the predetermined limit using the addresses directly.

6. The method as recited in claim 1 wherein the address range is established below a predetermined limit in the memory map, and wherein the second portion of the address range is mapped to portions of the memory map above the predetermined limit.

7. The method as recited in claim 6 wherein the predetermined limit is determined by a maximum address that is physically generable by the one or more peripheral devices.

8. The method as recited in claim 1 wherein the one or more peripheral devices are coupled to a peripheral interface that is separate from a graphics interface to which the graphics device is coupled.

9. A computer readable medium storing:

a first one or more instructions to establish an address range within a memory map, wherein addresses within the address range are to be mapped to other addresses within the memory map through an address relocation table;

a second one or more instructions to configure a graphics device to use a first portion of the address range for accesses to memory; and a third one or more instructions to configure one or more peripheral devices to use a second portion of the address range for accesses to memory, wherein the one or more peripheral devices are different from the graphics device.

10. The computer readable medium as recited in claim 9 wherein the third one or more instructions configure the one or more peripheral devices to use the second portion for accesses to memory above a predetermined limit in the memory map.

11. The computer readable medium as recited in claim 10 wherein the predetermined limit is 4 gigabytes.

12. The computer readable medium as recited in claim 10 wherein the first range is used to map addresses anywhere in the memory map.

13. The computer readable medium as recited in claim 9 further storing a fourth one or more instructions to configure address relocation circuitry to respond to the address range for remapping addresses.

14. The computer accessible medium as recited in claim 9 wherein the address range is established below a predetermined limit in the memory map, and wherein the second portion of the address range is mapped to portions of the memory map above the predetermined limit.

15. The computer accessible medium as recited in claim 14 wherein the predetermined limit is determined by a maximum address that is physically generable by the one or more peripheral devices.

16. The computer readable medium as recited in claim 9 wherein the one or more peripheral devices are coupled to a peripheral interface that is separate from a graphics interface to which the graphics device is coupled.

17. A computer system comprising:

one or more address relocation caches configured to store mappings between addresses within an address range of a memory map and other addresses within the memory map;

a graphics device configured to access a first portion of the address range; and one or more peripheral devices configured to access a second portion of the address range;

wherein the one or more address relocation caches are coupled to receive addresses from the graphics device and the peripheral devices and to provide corresponding addresses outside of the address range if the addresses received from the graphics device and the peripheral devices are within the address range, the one or more address relocation caches providing the corresponding addresses responsive to the stored mappings.

18. The computer system as recited in claim 17 wherein a first address relocation cache of the address relocation caches is coupled to receive addresses from the graphics device and wherein a second address relocation cache of the address relocation caches is coupled to receive addresses from the one or more peripheral devices.

19. The computer system as recited in claim 18 wherein the first address relocation cache is not coupled to receive addresses from the one or more peripheral devices, and wherein the second address relocation cache is not coupled to receive addresses from the graphics device.

20. The computer system as recited in claim 18 wherein the first address relocation cache stores mappings corresponding to the first portion of the address range during use and the second address relocation cache stores mappings corresponding to the second portion of the address range during use.

21. The computer system as recited in claim 20 wherein the first address relocation cache stores only mappings corresponding to the first portion of the address range during use and the second address relocation cache stores only mappings corresponding to the second portion of the address range during use.

22. The computer system as recited in claim 17 wherein each of the one or more address relocation caches is integrated into a node with a processor.

23. The computer system as recited in claim 22 further comprising a graphics interface circuit coupled to the graphics device and a peripheral interface circuit coupled to the one or more peripheral devices, wherein the graphics interface circuit and the peripheral interface circuit are coupled in a daisy chain to a node including the address relocation cache.

24. The computer system as recited in claim 23 wherein the daisy chain comprises pairs of unidirectional, point-to-point, packet-based links.

25. The computer system as recited in claim 22 further comprising a graphics interface circuit coupled to the graphics device and to a first node including a first address relocation cache of the address relocation caches, the computer system still further comprising a peripheral interface circuit coupled to the one or more peripheral devices and to a second node including a second address relocation cache of the address relocation caches.

26. The computer system as recited in claim 25 wherein the graphics interface circuit is coupled to the first node using a pair of unidirectional, point-to-point, packet-based links, and wherein the peripheral interface circuit is coupled to the second node using a pair of unidirectional, point-to-point, packet-based links.

27. The computer system as recited in claim 17 wherein the second portion of the address range is mapped to portions of the memory map above a predetermined limit.

28. The computer system as recited in claim 27 wherein the predetermined limit is four gigabytes.

29. The computer system as recited in claim 27 wherein the first portion of the address range is mapped anywhere in the memory map.

30. The computer system as recited in claim 27 wherein the one or more peripheral devices access addresses in the memory map below the predetermined limit using the addresses directly.

31. An apparatus comprising one or more address relocation caches configured to store mappings between addresses within an address range of a memory map and other addresses within the memory map, wherein the one or more address relocation caches are coupled to receive addresses from a graphics device configured to access a first portion of the address range and from at least one peripheral device configured to access a second portion of the address range, and wherein the one or more address relocation caches are configured to provide corresponding addresses outside of the address range if the addresses received from the graphics device and the peripheral device are within the address range, wherein the one or more address relocation caches provide the corresponding addresses responsive to the stored mappings.

32. The apparatus as recited in claim 31 wherein a first address relocation cache of the address relocation caches is coupled to receive addresses from the graphics device and wherein a second address relocation cache of the address relocation caches is coupled to receive addresses from the peripheral device.

33. The apparatus as recited in claim 32 wherein the first address relocation cache is not coupled to receive addresses from the peripheral device, and wherein the second address relocation cache is not coupled to receive addresses from the graphics device.

34. The apparatus as recited in claim 32 wherein the first address relocation cache stores mappings corresponding to the first portion of the address range during use and the second address relocation cache stores mappings corresponding to the second portion of the address range during use.

35. The apparatus as recited in claim 34 wherein the first address relocation cache stores only mappings corresponding to the first portion of the address range during use and the second address relocation cache stores only mappings corresponding to the second portion of the address range during use.

36. The apparatus as recited in claim 31 wherein the second portion of the address range is mapped to portions of the memory map above a predetermined limit.

37. The apparatus as recited in claim 36 wherein the predetermined limit is four gigabytes.

38. The apparatus as recited in claim 36 wherein the first portion of the address range is mapped anywhere in the memory map.

39. The apparatus as recited in claim 36 wherein the peripheral device accesses addresses in the memory map below the predetermined limit using the addresses directly.

40. A computer system comprising:

at least one translation circuit configured to translate addresses within an address range of a memory map according to translations stored in an address relocation table;

a graphics device configurable to access a first portion of the address range; and at least one peripheral device configurable to access a second portion of the address range;

wherein the address range is below a predetermined limit in the memory map and the second portion of the address range is mapped to other addresses above the predetermined limit by the at least one translation circuit responsive to the translations in the address relocation table during use.

41. The computer system as recited in claim 40 wherein the predetermined limit is four gigabytes.

42. The computer system as recited in claim 40 wherein the first portion of the address range is mapped anywhere in the memory map during use.

43. The computer system as recited in claim 40 wherein the one or more peripheral devices access addresses in the memory map below the predetermined limit using the addresses directly during use.

44. The computer system as recited in claim 40 wherein the predetermined limit is determined by a maximum address that is physically generable by the peripheral device.

45. A method comprising:

establishing an address range within a memory map, the address range to be mapped through an address relocation table;

configuring a graphics device to use a first portion of the address range for access to memory; and configuring at least one peripheral device to use a second portion of the address range to access memory above a predetermined limit, wherein the address range is below the predetermined limit and the second portion of the address range is mapped to other addresses above the predetermined limit through the address relocation table.

46. The method as recited in claim 45 wherein the predetermined limit is four gigabytes.

47. The method as recited in claim 45 wherein the first portion of the address range is mapped anywhere in the memory map.

48. The method as recited in claim 45 further comprising configuring the peripheral device to access addresses in the memory map below the predetermined limit using the addresses directly.

49. The method as recited in claim 45 wherein the predetermined limit is determined by a maximum address that is physically generable by the peripheral device.

50. A computer readable medium storing a plurality of instructions which, when executed, implement a method comprising:

establishing an address range within a memory map, the address range to be mapped through an address relocation table;

configuring a graphics device to use a first portion of the address range for access to memory; and configuring at least one peripheral device to use a second portion of the address range to access memory above a predetermined limit, wherein the address range is below the predetermined limit and the second portion of the address range is mapped to other addresses above the predetermined limit through the address relocation table.

51. The computer readable medium as recited in claim 50 wherein the predetermined limit is four gigabytes.

52. The computer readable medium as recited in claim 50 wherein the first portion of the address range is mapped anywhere in the memory map.

53. The computer readable medium as recited in claim 50 wherein the method further comprises configuring the peripheral device to access addresses in the memory map below the predetermined limit using the addresses directly.

54. The computer readable medium as recited in claim 50 wherein the predetermined limit is determined by a maximum address that is physically generable by the peripheral device.

* * * * *